United States Patent
Turner et al.

(10) Patent No.: US 12,501,502 B2
(45) Date of Patent: Dec. 16, 2025

(54) PRIORITIZED RESIDENT ELECTRONIC DEVICE IN HOME

(71) Applicant: Apple Inc., Cupertino, CA (US)

(72) Inventors: Benjamin S. Turner, San Francisco, CA (US); Andreas I. Gal, San Mateo, CA (US); Hung Q. Le, Mountain View, CA (US); Karsten Sperling, Auckland (NZ); Keith W. Rauenbuehler, San Francisco, CA (US)

(*) Notice: Subject to any disclaimer, the term of this patent is extended or adjusted under 35 U.S.C. 154(b) by 0 days.

(21) Appl. No.: 17/994,818

(22) Filed: Nov. 28, 2022

(65) Prior Publication Data

US 2023/0397269 A1 Dec. 7, 2023

Related U.S. Application Data

(60) Provisional application No. 63/349,144, filed on Jun. 5, 2022.

(51) Int. Cl.
*H04W 76/14* (2018.01)
*H04L 67/51* (2022.01)

(52) U.S. Cl.
CPC .............. *H04W 76/14* (2018.02); *H04L 67/51* (2022.05)

(58) Field of Classification Search
CPC G08B 13/19656; G08B 25/004; G08B 29/18; G08B 29/181; G08B 25/007;
(Continued)

(56) References Cited

U.S. PATENT DOCUMENTS

| 8,214,494 B1* | 7/2012 | Slavin | H04L 12/2823 709/224 |
| 8,539,567 B1* | 9/2013 | Logue | H04L 63/08 709/227 |

(Continued)

FOREIGN PATENT DOCUMENTS

WO 2015047167 A1 4/2015

OTHER PUBLICATIONS

International Patent Application No. PCT/US2023/024186, "Invitation to Pay Additional Fees and, Where Applicable, Protest Fee", Sep. 18, 2023, 4 pages.

(Continued)

*Primary Examiner* — Greg C Bengzon

(57) ABSTRACT

Aspects of the disclosure include a method for communicating between a controller device and resident device. An example method includes detecting, by a controller, the resident device and an accessory connected to a local network. Establishing, by the controller, a first direct connection with the accessory. Receiving, by the controller, an input that identifies a control instruction for controlling the accessory. Determining, by the controller, whether to transmit a message comprising the control instruction to the accessory via the first direct connection with the accessory or the second direct connection with the resident device. Transmitting, by the controller, the message comprising the control instruction to the resident device via the second direct connection, the resident device configured to relay the message comprising the control instruction to the accessory.

20 Claims, 11 Drawing Sheets

(58) Field of Classification Search
CPC ...... G08B 25/009; G08B 25/10; G08B 29/16; H05B 47/19; H05B 47/12; H05B 47/115; H05B 47/13; H05B 47/195; H05B 39/088; H04L 63/08; H04L 67/01; H04L 67/1095; H04L 12/282; H04L 12/2825; H04L 12/2816; H04L 2012/2841; H04L 47/122; H04L 12/2807; H04L 12/2809; H04L 12/2814; H04L 12/2818; H04L 12/2821; H04L 12/2823; H04L 12/2827; H04L 12/2829; H04L 12/283; H04L 12/2832; H04L 12/2834; H04L 12/2836; H04L 12/2838; H04L 67/142; H04L 67/148; H04L 67/2866; H04L 67/2869; H04L 67/2871; H04L 67/2876; H04L 67/288; H04L 67/2885; H04L 67/289; H04L 67/2895; G09G 2330/021; G09G 2360/10; H04N 21/41265; H04N 21/4436
See application file for complete search history.

(56) References Cited

U.S. PATENT DOCUMENTS

| | | | | |
|---|---|---|---|---|
| 8,635,373 | B1* | 1/2014 | Supramaniam | H04L 67/1095 709/248 |
| 9,026,841 | B1* | 5/2015 | Kim | H04W 12/12 714/4.3 |
| 9,655,214 | B1* | 5/2017 | Sooch | H05B 47/155 |
| 9,655,215 | B1* | 5/2017 | Ho | H05B 47/155 |
| 10,153,966 | B1* | 12/2018 | Trundle | H04L 43/04 |
| 10,327,314 | B1* | 6/2019 | Shin | H04W 4/80 |
| 10,593,174 | B1* | 3/2020 | Yoon | H04L 12/2816 |
| 10,652,735 | B2* | 5/2020 | Li | G08B 5/222 |
| 10,673,646 | B1* | 6/2020 | Shinar | H04L 12/2816 |
| 10,849,175 | B2* | 11/2020 | Vanscoyk | H04W 48/18 |
| 11,532,189 | B2* | 12/2022 | Marcinkowski | G07C 9/00904 |
| 2012/0191257 | A1* | 7/2012 | Corcoran | F24F 11/46 700/278 |
| 2012/0239221 | A1* | 9/2012 | Mighdoll | H04L 12/2818 700/300 |
| 2012/0290740 | A1* | 11/2012 | Tewari | G06F 16/27 709/248 |
| 2013/0145057 | A1* | 6/2013 | Rathi | G06F 13/4286 710/38 |
| 2014/0222899 | A1* | 8/2014 | Supramaniam | H04L 67/1095 709/203 |
| 2015/0156270 | A1 | 6/2015 | Teraoka et al. | |
| 2015/0302057 | A1 | 10/2015 | Kealey et al. | |
| 2016/0006692 | A1 | 1/2016 | Kako | |
| 2016/0226707 | A1* | 8/2016 | Schallich | H04L 41/0806 |
| 2016/0234186 | A1* | 8/2016 | Leblond | H04L 67/34 |
| 2016/0285717 | A1* | 9/2016 | Kim | H04L 41/0631 |
| 2016/0286607 | A1* | 9/2016 | Mishra | G08B 25/009 |
| 2017/0024378 | A1* | 1/2017 | Sharma | H04L 63/08 |
| 2017/0171090 | A1* | 6/2017 | Britt | H04L 12/2803 |
| 2017/0344703 | A1 | 11/2017 | Ansari et al. | |
| 2017/0359190 | A1 | 12/2017 | Nadathur et al. | |
| 2018/0061219 | A1* | 3/2018 | Gordon | G08B 29/181 |
| 2018/0228006 | A1* | 8/2018 | Baker | G10L 15/22 |
| 2018/0324934 | A1* | 11/2018 | Wootton | H02J 13/00007 |
| 2018/0359809 | A1* | 12/2018 | Sohn | H05B 47/19 |
| 2019/0132396 | A1* | 5/2019 | Finnegan | H04L 12/2818 |
| 2019/0327128 | A1* | 10/2019 | Harpole | G08B 13/19656 |
| 2019/0335018 | A1* | 10/2019 | Supramaniam | H04L 63/08 |
| 2019/0347916 | A1* | 11/2019 | Wild | H04L 67/1095 |
| 2020/0059497 | A1* | 2/2020 | Straub | H04L 65/102 |
| 2020/0374149 | A1* | 11/2020 | Bernal Barros | H04L 67/12 |
| 2020/0412566 | A1* | 12/2020 | Mo | H04L 12/282 |
| 2023/0171302 | A1* | 6/2023 | Supramaniam | H04L 63/08 709/203 |
| 2023/0199932 | A1* | 6/2023 | Van Goor | H04W 4/33 315/152 |
| 2025/0240183 | A1* | 7/2025 | Smith | H04L 12/4625 |

OTHER PUBLICATIONS

International Patent Application No. PCT/US2023/024186, "International Search Report and Written Opinion", Nov. 28, 2023, 19 pages.

International Patent Application No. PCT/US2023/024186, International Preliminary Report on Patentability, Mailed On Dec. 19, 2024, 11 pages.

* cited by examiner

PRIORITIZED RESIDENT ELECTRONIC DEVICE IN HOME

This application is claims priority under 35 U.S.C. § 119(e) to U.S. Provisional Application No. 63/349,144, filed on Jun. 5, 2022, entitled "Prioritized Resident Electronic Device in Home," the contents of each of which are herein incorporated by reference.

BACKGROUND

Environments such as residential and professional spaces are populated by devices that can electronically perform functions that people traditionally had to manually perform. To enable a division of labor and reduce the complexity of these devices, manufacturers design and deliver use-specific devices for consumers to integrate into their environments. To enable a cohesive environment in which these devices can combine their efforts to perform a task, a system can be used for converting an instruction from one device into a responsive action by another device.

DETAILED DESCRIPTION

In the following description, various examples will be described. For the purposes of explanation, specific configurations and details are set forth to provide a thorough understanding of the examples. However, it will also be apparent to one skilled in the art that the examples may be practiced without the specific details. Furthermore, well-known features may be omitted or simplified in order not to obscure the example being described.

Computing devices can communicate with each over a variety of transmission protocols from long range Internet-based communication to short-range technologies such as Bluetooth and near field communication (NFC). As devices are integrated into everyday environments, communication between the devices can be constrained by the limitations of one or more of the devices, or the limitations of a communication network. For example, one device may attempt to transmit a message to another device over a Wi-Fi network. However, if the Wi-Fi network is not functioning properly (or is not otherwise accessible), the message may not be received by the other device. Another issue can be if a device has multiple communication channels open with multiple devices, the device's processing may be diverted to maintaining separate communication channels and processing multiple data packets from multiple devices, as opposed to just transmitting data. This can lead to increased contention events for the device's processing resources and increased energy demands on the device.

Embodiments described herein address the above referenced issues by providing a communication framework in which one device in an environment is designated as a primary device for routing inter-device communications in the environment. If a device transmits a communication to another device, the communication may be initially routed to the primary device rather than being directly transmitted to the other device. The primary device can then transmit the instruction to the other device. Advantageously, the primary device can be configured to have one or more stable and secure communication channels with the other device. Therefore, by routing communications to the primary device, this communication framework can ensure that the communication from the device is delivered to the other device. In some examples, the primary device may be configured as a resident device, configured to be stationary at a given location (e.g., at a home or office) and/or regularly plugged-in to electrical power (e.g., as opposed to using a battery).

Figure 1:
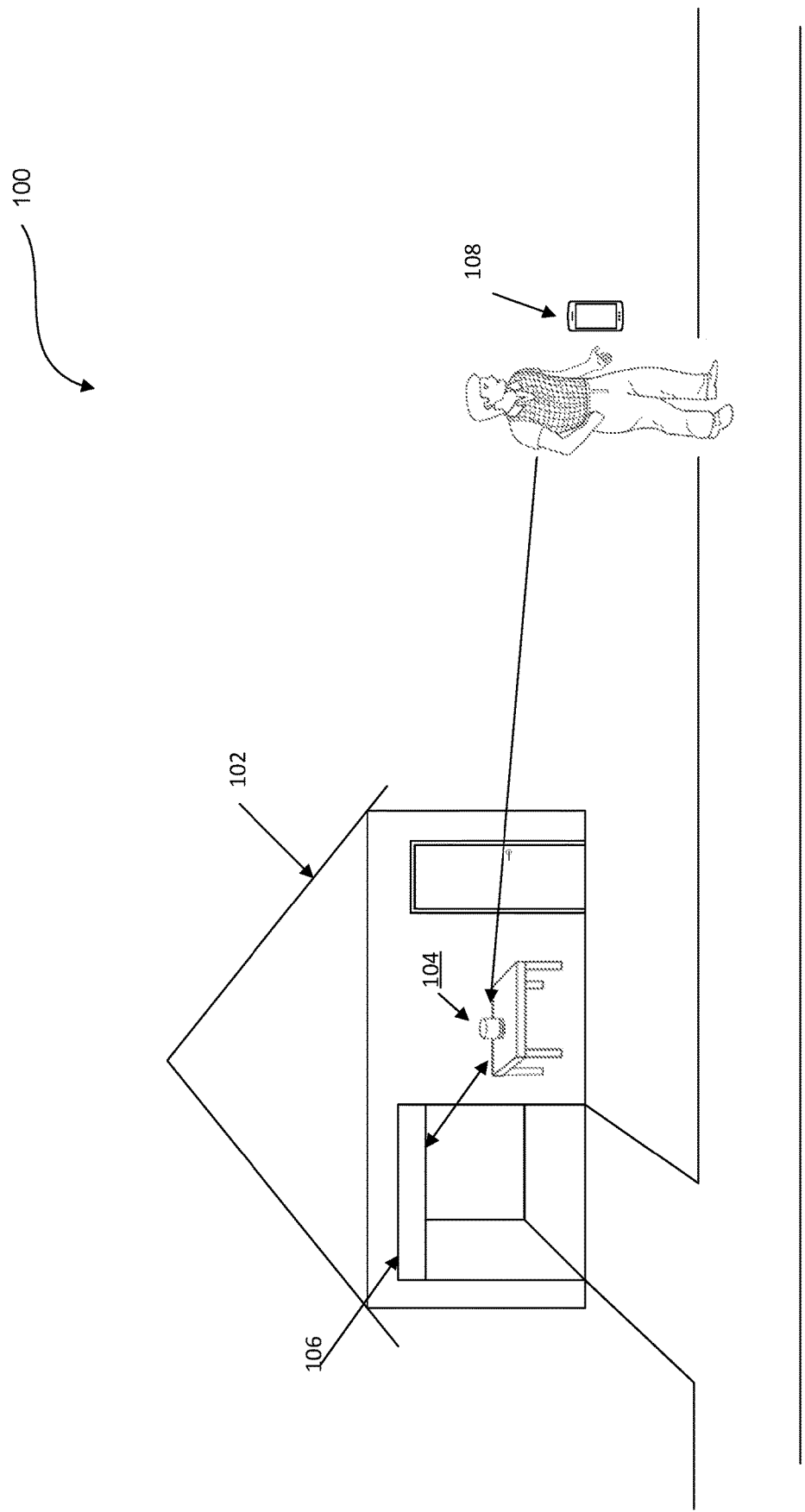
FIG. 1 is an illustration of a mobility use case at an environment, according to some embodiments.

FIG. 1 is an illustration 100 of a mobility use case at an environment, according to some embodiments. As illustrated, a house 102 can include a resident device 104 (e.g., a tablet, smart speaker, a smart digital media player configured to control a television (TV), etc.) that has a secure communication channel with an accessory device 106 (e.g., a smart thermostat, smart fan, smart windows, smart garage door opener). The resident device 104 can be configured to receive a message from a controller device (e.g., any user device configured to provide control instructions to an accessory), the message being intended for the accessory device 106. The resident device 104 can further be configured to transmit the message to the accessory device 106 on behalf of the controller device. The accessory device 106 can be configured to perform some action in response to receiving the message from the resident device 104.

A user can have a controller device 108 that is connected to the resident device 104 and the accessory device 106. In certain situations, the user may need to communicate with the accessory device 106, however this may not always be practical. For example, the user can be walking away from the house 102, but have left the garage door open (e.g., accessory device 106). The controller device 108 can have a weak connection to the accessory device 106 based on, for example, a distance between the controller device 108 and the accessory device 106. Therefore, even if the resident device 104 was not configured to route all communications between the controller device 108 (e.g., smartphone) and the accessory device 106 (e.g., garage door), the user may be unable to properly communicate with the accessory device 106.

The user can, however, be in communication with the resident device 104 via the controller device 108. The controller device 108 can communicate with the resident device 104 via multiple transmission protocols, such as Wi-Fi or a cellular protocol. One protocol between the controller device 108 and the resident device 104 may be performing poorly, and therefore, the controller device can communicate with the resident device 104 over another protocol.

The controller device 108 can further elect to transmit the message to the resident device 104 rather than directly to the accessory device 106 even though the controller device 108 has a connection, albeit weak, with the accessory device 106. The controller device 108 can transmit the message to the resident device 104. The resident device 104 can receive the message and transmit the message to the accessory device 106. The accessory device 106 can receive the communication, including the instruction (e.g., close the garage door) and perform a responsive action (e.g., closing the garage door).

Figure 2:
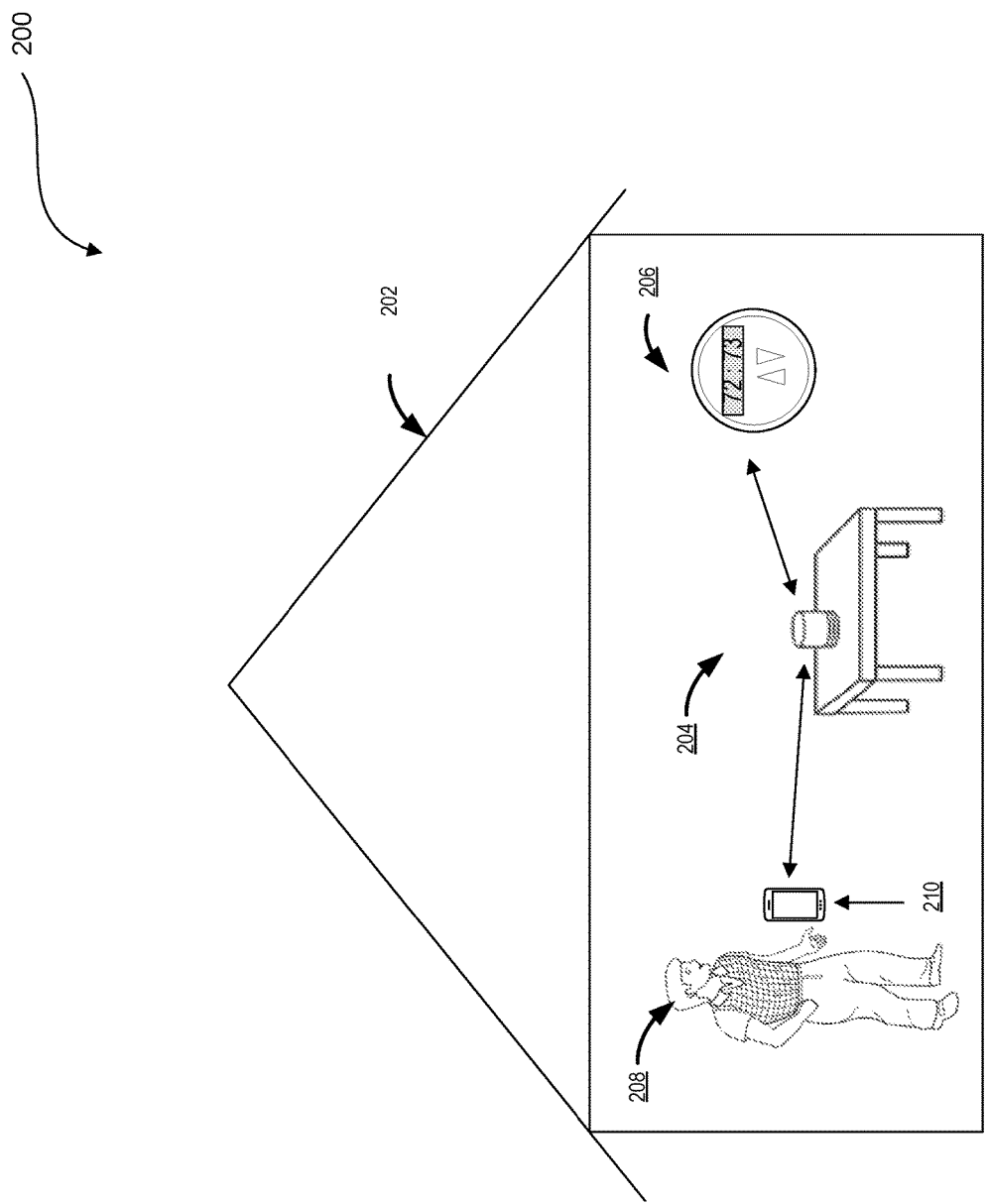
FIG. 2 is an illustration of a controller request to an accessory via a resident device, according to some embodiments.

FIG. 2 is an illustration 200 of a controller request to an accessory via a resident device, according to some embodiments. A house 202 can include a resident device 204 (e.g., a tablet, smart speaker, a smart digital media player configured to control a television (TV), etc.) and an accessory device 206. The accessory device 206 can be any device configured to perform an operation/action based on a control instruction. The accessory device 206 can further have a state, report that state, receive control instructions, and act on the instructions. Some examples of an accessory device 206 include a smart thermostat, smart fan, smart windows, and a smart garage door opener. At some point, a user 208 can request information from the accessory device 206, such as a state of the accessory device 206. The user 208 can have a controller device 210 that is connected to the resident device 204 and the accessory device 206 via a local network, such as a Wi-Fi network.

The controller device 210 can further detect the resident device 204 and the accessory device 206, for example, as a result of being connected to the same network. The controller device 210 can further be connected to the resident device 204 and the accessory device 206 via the network connections.

The user 208 can enter an input into the controller device 210 for instructing the accessory device 206 to perform some function, such as provide a state or perform an operation (e.g., turn on the light, etc.). The accessory device state can be a set of variables or inputs associated with the accessory device 206 at a given time.

Independent of the user's instruction to request a state of the accessory device 206, the resident device 204 can, from time to time, transmit a message to all accessory devices in the house 202 for an accessory device state update. The accessory device 206 can transmit an accessory state to the resident device 204 in response to the transmission. In some embodiments, the accessory device 206 only transmits changes in accessory state to the resident device 204. The resident device 204 can store the accessory state in cache. If the accessory state has changed, the resident device 204 can further discard the previous state based on a cache eviction policy.

Returning to the controller device 210, the controller device 210 can determine to send the request for the accessory state to the resident device 204 rather than the accessory device 206. For example, the controller device 210 can be configured to, in a choice between the resident device 204 and the accessory device 206, determine to transmit a message to the resident device 204.

In some instances, the controller device 210 can send two messages to the resident device. A first message, including the request for an accessory state, over a first transmission protocol and a second redundant message over a second transmission protocol, where the second message is a copy of the first message. The resident device 204 can receive one or both of the messages based on the quality of the communication channels. The resident device 204 can further elect to dispose (e.g., delete, store) of the second received message based on determining that it is a copy of the previous message. It should be appreciated regardless of the transmission protocol that the initial message is received upon, the resident device 204 can respond via any appropriate transmission protocol.

The resident device 204 can receive the message from the controller device 210, including the request for the accessory state. In response to receiving the message, the resident device 204 can retrieve the accessory state from the cache. The resident device 204 can transmit a response to the controller device 210 that includes the accessory state.

For example, the user 208 may wish to know the temperature setting of a smart thermostat (e.g., accessory device) at the house 202. The user can transmit a request for the temperature (e.g., accessory state) to the resident device 204. The resident device 204 can have previously received the temperature (e.g., accessory state) from the smart thermostat and stored the temperature in cache. The resident device 204 can retrieve the temperature from the cache and transmit it to the controller device 210. The controller device 210 can display the temperature for the user 208.

Figure 3:
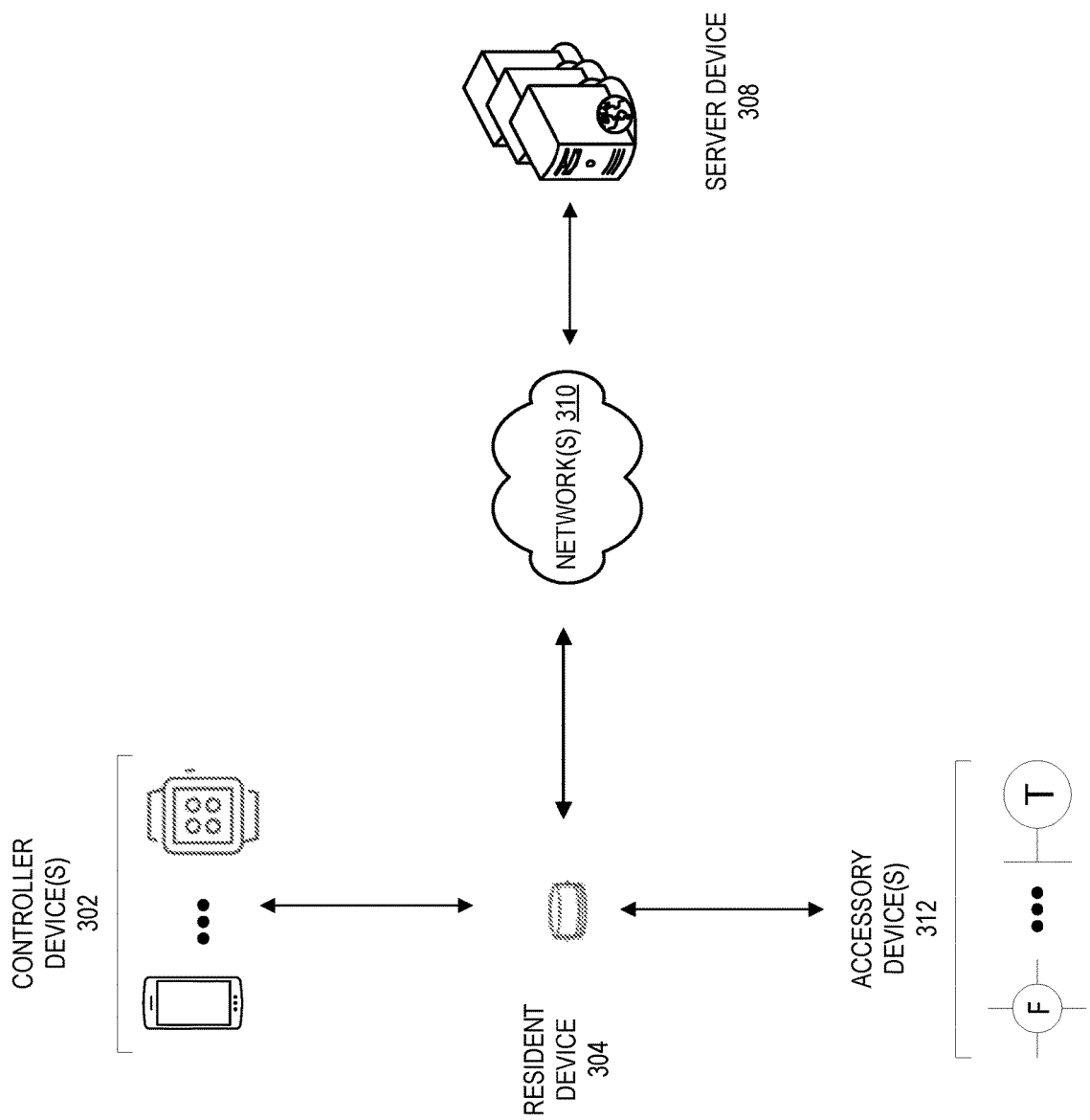
FIG. 3 is an illustration of an example architecture of a system used to synchronize data between one or more devices, according to some embodiments.

FIG. 3 is an illustration of an example architecture of a system used to synchronize data between one or more devices, according to some embodiments. The diagram 300 includes one or more controller devices 302, a resident device 304, a server device 308, one or more network(s) 310, and one or more accessory devices 312. Each of these elements depicted in FIG. 3 may be similar to one or more elements depicted in other figures described herein. For example, the controller devices 302 may be similar to any of the other user devices described herein, and so forth. In some embodiments, at least some (e.g., and/or all) elements of diagram 300 may operate within the context of a home environment or an office environment.

Turning to each element in further detail, a controller device of the one or more controller devices 302 may be any suitable computing device (e.g., a mobile phone, tablet, personal computer (PC), smart glasses, a smartwatch, etc.). In some embodiments, a controller device 302 may perform any one or more of the operations of user devices described herein. Depending on the type of a controller device and/or location of the user device (e.g., within the home environment or outside the home environment), the controller device may be enabled to communicate using one or more network protocols (e.g., a Bluetooth connection, a Thread connection, a ZigBee connection, an Infrared connection, a Wi-Fi connection, etc.) and/or network paths over the network(s) 310 (e.g., including a LAN and/or WAN), described further herein.

In some embodiments, the server device 308 may be a computer system that comprises at least one memory, one or more processing units (or processor(s)), a storage unit, a communication device, and an I/O device. In some embodiments, the server device 308 may perform any one or more of the operations of server devices described herein. In some embodiments, these elements may be implemented similarly (or differently) than as described in reference to similar elements of the resident device 304. In some embodiments, the server device 308 can receive from one or more controller or accessory devices of diagram 300 via the resident device 304. In some embodiments, the server device 308 may be used to send data updates to one or more of the controller or accessory devices via the resident device 304.

In some embodiments, the resident device 304 may correspond to any one or more of the resident devices described herein (e.g., a tablet, a smart speaker device, a smart media player communicatively connected to a TV, etc.). In some instances, an environment can include more than one resident device. In these instances, one resident device is designated the resident device 304 and the balance of the resident devices can be designated redundant resident devices. Furthermore, connections between the one or more accessory devices 312 and the redundant resident devices can be severed, such that communication between the one or controller devices 302 and the one or more accessory devices 312 is routed through the resident device 304. For example, a controller device can request that an accessory device perform some task, and the accessory device may need some capability from the redundant resident device. The resident device 304 can designate the redundant resident device as an auxiliary resident device to complete the task. In response to completing the task, the communication between the controller device the auxiliary resident device and the accessory device can be severed. In the instance that the controller device attempts communication with the accessory device, the communication is routed through the resident device 304.

In some embodiments, the one or more network(s) 310 may include a WAN (e.g., the Internet) and/or a LAN. As described herein, the home environment may be associated with the LAN, whereby devices present within the home environment may communicate with each other over the LAN. As described herein, the WAN may be external from the environment. For example, a router associated with the LAN (and thus, the home environment) may enable traffic from the LAN to be transmitted to the WAN, and vice versa. In some embodiments, the server device 308 may be external to an environment in which the resident device 304 and accessory devices 312 are located, and thus, communicate with other devices over the WAN via the resident device 304. In some embodiments, the resident device 304 may typically be resident within the home environment and communicate with other devices of the home environment over the LAN. In some embodiments, the controller devices 302 may be transient. For example, as described herein, a controller device 302 may be present within the home environment (e.g., and communicate over the LAN), while, in another example, the controller device 302 may be outside the home environment and communicate over the Internet (or other suitable network) (see, for example, FIG. 1).

As described herein, the resident device 304 may be included in one or more resident devices of the resident devices within an environment. The environment can be governed by a communication framework, in which communication between the controller device 302 and the accessory devices 312 are routed through the resident device 304. Furthermore, communications between the controller devices 302 and the server device 308, or communications between the accessory devices 312 and the server device 308 are also routed through the resident device 304.

In some instances, the server device 308 can transmit data for receipt by one or more controller devices 302 one by or more of the accessory devices 312. The data can be, for example, a software update, a modification of a protocol, personal user data, a response to requested information, or other data for receipt by the one or more controller devices 302 or by the one or more of the accessory devices 312. Rather than communicate directly with the one or more of the accessory devices 312, the server device 308 can determine to communicate with the resident device 304 via the network(s) 310. The server device 308 can make this determination even if the server device 308, the one or more controller devices 302, and the one or more of the accessory devices 312 are connected via the network(s) 310.

The resident device 304 can receive data from the server device 308 via the network(s) 310. The resident device 304 can transmit a non-awakening message to the one or more controller devices 302 or the one or more accessory devices 312 indicating the receipt of the data from the server device 308. The message can be non-awakening such that a controller device or an accessory device in sleep mode does not awaken based on receipt of the message.

The data received from the server device 308 can be encrypted and decrypted by the resident device 304. Conversely, data, including data received from a controller device or accessory device, transmitted to the server device 308 can be encrypted by the resident device 304. In this sense, any personal data received by the resident device 304 is in encrypted form prior to being transmitted to the server device 308. As such, encryption/decryption logic and responsibility can be assumed by the resident device 304. The one or more accessory devices 312 can rely on the resident device 304 for encryption/decryption, which reduces energy usage by an accessory device and frees up processing capacity for the one or more accessory devices 312. For example, a controller device can transmit personal health information of a user to the resident device 304 in unencrypted form. In some instances, this data may be stored at the server device 308. Prior to sending the personal data to the server device 308, the resident device 304 can encrypt the data. Therefore, even in a bad actor were to access the server device 308, the personal data of the user is encrypted.

In response to the message, each controller device or accessory device can transmit a data status to resident device 304. The data status can include a token that indicates a data status of the respective controller device or accessory device. For example, the token can include time stamp of last data received by the controller device or accessory device from the server device 308. The token may further include a description of a previously updated data.

In some instances, one controller device or accessory device can have been previously updated based on a last data update and another device was not updated based on the last data update. Therefore, upon receipt of the respective data status of each accessory device, the resident device 304 can determine a difference of the data stored at the controller or accessory device and the data received from the server device 308. If there is no difference between the data stored at the controller or accessory device and the data received from the server device 308, the resident device 304 can determine not to transmit data to the controller or accessory device.

If, however, the resident device 304 determines that there a difference between the data stored at a controller device or an accessory device and the data received from the server device 308, then the resident device 304 can transmit data to the controller device or accessory device to synchronize the data stored at the server device with the data stored at the controller device or accessory device. For example, based on the time stamp of a token received from an accessory device and a time of arrival of the data from the server device 308, the resident device 304 can determine that the accessory device should receive some portion of the data received from the server device. In some instances, the token can include, for example, an update identifier for identifying a last update.

In some instances, the resident device 304 can further format the data to be compatible with a format of a controller device or accessory device. For example, the accessory device can be operating on an older version of an operating system than the server device 308. In these instances, the resident device 304 can reformat the data (e.g., modifying a data schema) received from the server device 308 to be compatible with a format of the accessory device.

The resident device 304 device can further mediate a communication between the one or more controller devices 302 or one or more accessory devices 312 and the server device 308. For example, the resident device 304 can receive message from a controller device or an accessory device that requires synchronization with data on the server device 308. Furthermore, in some instances the controller device or accessory device's message is formatted differently than the server device can receive. For example, the controller device or accessory device can use an older operating system version than the server device 308. The resident device 304 can reformat the message to be compatible with server device 308. The resident device 304 can then the reformatted message and transmit it to the server device 308.

Take, for example, a situation in which a user uses an application on their mobile phone, such as a home management application, and wants to rename a room from "living room" to "lounge" on the application. The user can use a controller device to transmit a message requesting to synchronize the change at the server device 308. However, the controller device can use a version of an operating system that is older than the version implemented by the server device 308. In this situation, the resident device 304 can, based on the schema of the request, determine that the request is not formatted properly for the server device 308. Therefore, the resident device 304 can reformat the message to be compatible with a format of the server device 308. The resident device 304 can then transmit the reformatted message to the server device 308.

Figure 4:
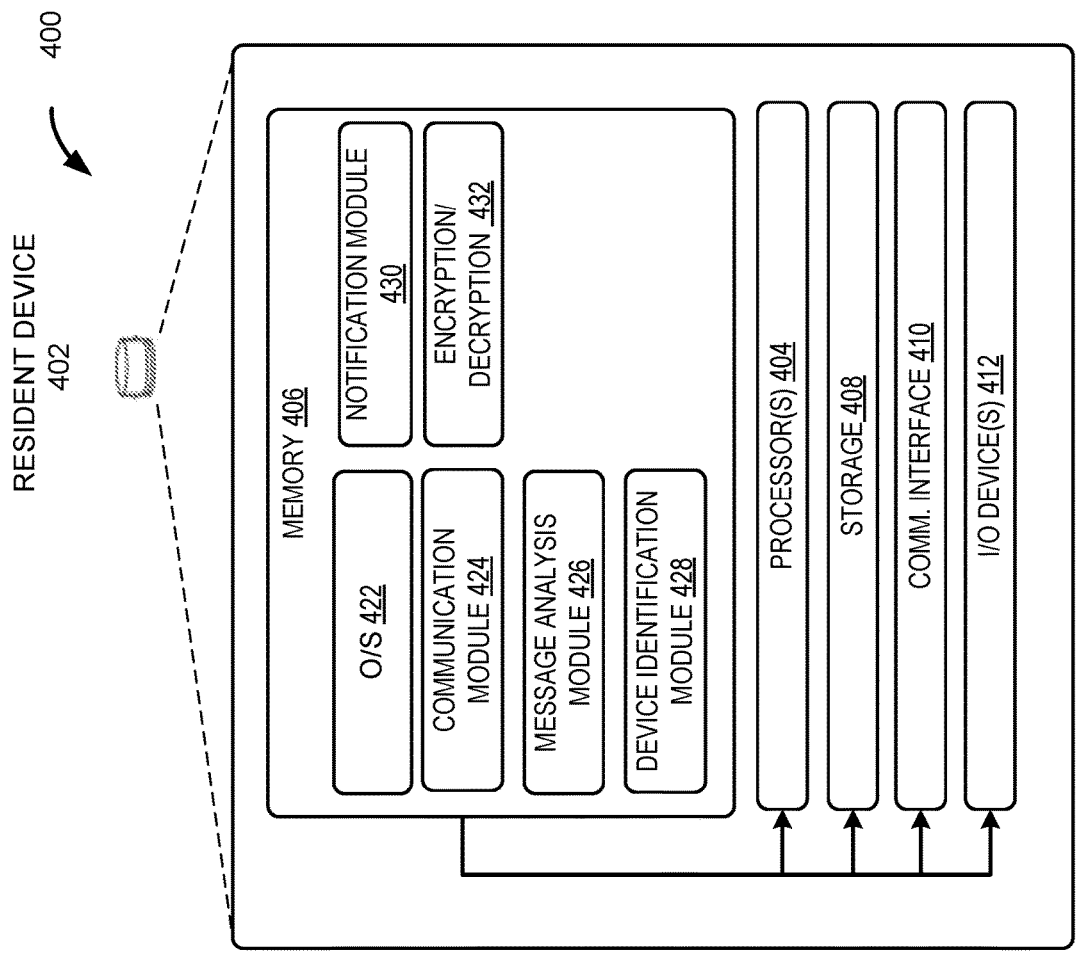
FIG. 4 is an illustration of a resident device, according to some embodiments.

FIG. 4 is an illustration 400 of a resident device, according to some embodiments. Turning to each element of the resident device 402 in further detail, the processor(s) 404 may be implemented as appropriate in hardware, computer-executable instructions, firmware or combinations thereof. Computer-executable instruction or firmware implementations of the processor(s) 404 may include computer-executable or machine executable instructions written in any suitable programming language to perform the various functions described.

The memory 406 may store program instructions that are loadable and executable on the processor(s) 404, as well as data generated during the execution of these programs. Depending on the configuration and type of resident device 402, the memory 406 may be volatile (such as random access memory (RAM)) and/or non-volatile (such as read-only memory (ROM), flash memory, etc.). In some implementations, the memory 406 may include multiple different types of memory, such as static random access memory (SRAM), dynamic random access memory (DRAM) or ROM. The resident device 402 may also include additional storage 408, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the storage 408 may be utilized to store data contents received from one or more other devices (e.g., one or more controller devices 302, the server device 308, and/or one or more accessory devices 312). The storage 408 may also store configuration settings, for example, indicating instructions for transmitting announcements to controller devices and accessory devices affiliated with the environment.

The resident device 402 may also contain the communications interface 410 that allows the resident device 402 to communicate with a stored database, another computing device or server, user terminals, and/or other devices on the network(s) 310. In particular, the communications interface 410 can enable the resident device 402 to route communications between one or more controller devices 302 and one or more accessory devices 312 through the resident device 402. The communications interface 410 can further enable the resident device 402 to route communications between one or more controller devices 302 and the server device 308, or communications between the one or more accessory devices 312 and the server device 308 through the resident device 402.

The resident device 402 may also include I/O device(s) 412, such as for enabling connection with a keyboard, a mouse, a pen, a voice input device, a touch input device, a display, speakers, a printer, etc. In some embodiments, the I/O devices(s) 412 may be used to input or output information from or to the one more controller devices 302 or the one or more accessory devices 312. This may include, but is not limited to, a light that may illuminate in a particular way (e.g., a particular color, flash, etc.) when a message arrives.

Turning to the contents of the memory 406 in more detail, the memory 406 may include an operating system 422 and one or more application programs or services for implementing the features disclosed herein, including a communications module 424, a message analysis module 426, a device identification module 428, a notification module 430, and an encryption/decryption module 432. The communications module 424 may comprise code that causes the processor 404 to generate messages, forward messages, reformat messages, and/or otherwise communicate with other entities (e.g., controller devices, accessory devices, and server devices). For example, as described herein, the communications module 424 may route, transmit, and/or receive messages to/from one or more controller devices 302, one or more accessory devices 312, and/or the server device 308. As described herein, the communications module 424 may transmit messages via one or more network paths of network(s) 310 (e.g., via a LAN associated with the home environment and/or a WAN).

The message analysis module 426 may comprise code that causes the processor 404 to receive and process a message to/from one or more controller devices 302, one or more accessory devices 312, and/or the server device 308. For example, the message analysis module 426 may obtain a message to determine a format of the message and compare the format with a format one or more controller devices 302, one or more accessory devices 312, and/or the server device 308. The message analysis module 426 may also determine, for example, a device's identity, a device's location, and other suitable information from the message.

The device identification module 428 may comprise code that causes the processor 404 to identify one or more devices that have either transmitted a state update, a data status, or are set to receive data from the server device 308. For example, the device identification module 428 may retrieve one or more device profiles (e.g., from storage 408) and identify one or more messages and being associated with a devices profile. In another example, the device identification module 428 may further identify one or more candidate data recipient devices based on a data status analysis.

The notification module 430 may comprise code that causes the processor 404 to transmit a non-awakening data update notification. In some embodiments, the presentation of the notification may depend in part on the type of recipient device (e.g., a mobile phone, a smart watch, a smart speaker, etc.). In other words, the notification may selectively choose which device to transmit a notification.

The encryption/decryption module 432 may comprise code that causes the processor 404 to encrypt and/or decrypt messages. For example, the encryption/decryption module 432 may transmit an encrypted message with data to the server device 308. In one example, the server device 308 may not have access to a cryptographic key operable for decrypting the encrypted message. Therefore, in response to a request for the data to the server device 308, the server device 308 may return the data in an encrypted form. The encryption/decryption module can store encryption keys, such as public keys and private keys to both encrypt and decrypt data to and from the server device 308.

Figure 5:
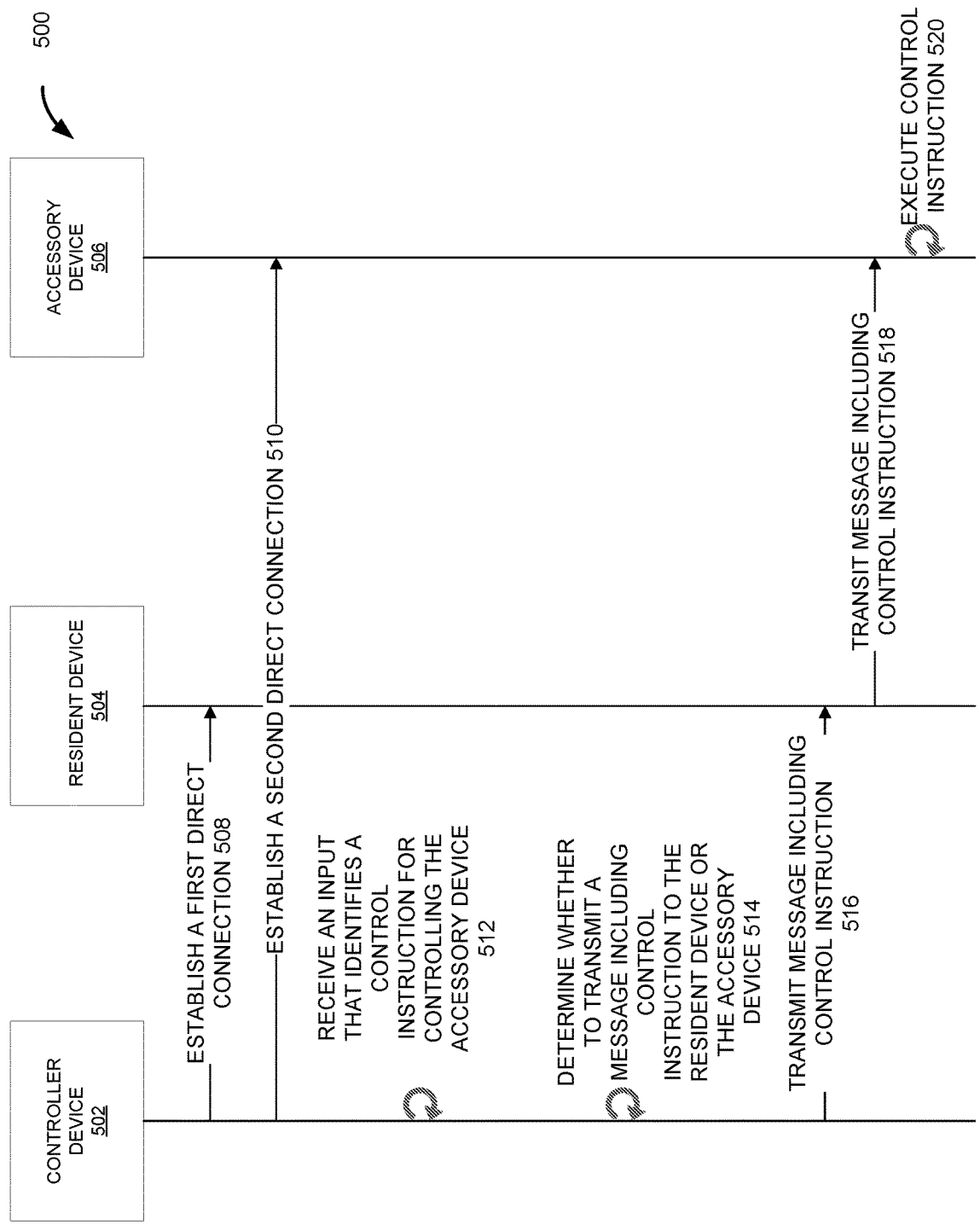
FIG. 5 is a signaling diagram for routing a message from a controller device to an accessory device via a resident device, according to some embodiments.

FIG. 5 is a signaling diagram 500 for routing a message from a controller device to an accessory device via a resident device, according to some embodiments. As illustrated, a controller device 502 is in communication with a resident device 504 and an accessory device 506. While the operations of processes 500, 600, 700, 800, and 900, are described as being performed by generic computers, it should be understood that any suitable device may be used to perform one or more operations of these processes. Processes 500, 600, 700, 800, and 900 (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

At 508, a controller device 502 can establish a first direct connection with a resident device 504. The connection can be based on, for example, the controller device 502 being connected to a network, such as a Wi-Fi network, wherein the resident device 504 is also connected to the network.

At 510, the controller device 502 can establish a direct connection with an accessory device 506. The connection can also be based on a connection of the accessory device 506 to the network. Each of the controller device 502, the resident device 504, and the accessory device 506 can be located in the same environment, such as a home environment.

At 512, the controller device 502 can receive an input that identifies a control instruction for controlling the accessory device 512. The controller device 502 can be a device such as a smart phone or laptop and operated by a user. The controller device 502 can further include I/O devices such as a keyboard or touch screen. The user can interact with the controller device 502 via the I/O device to enter the input. The input can further be to control some aspect of the accessory device 506. For example, the input can generate volume control instructions to control a volume of the accessory device 506.

At 514, the controller device 502 can determine whether to transmit a message including the control instructions to the resident device 504 or the accessory device 506. Generally, the controller device 502 would send the message with the control instructions directly to the accessory device 506 via the connection. However, as described herein, the controller device 502 can be configured to not only to recognize the direct and concurrent connections with both the resident device 504 and the accessory device 506, but to reject an option of transmitting the message directly to the accessory device 506 based at least in part on the detection of the resident device 504. The controller device 502 can be configured to determine whether to send the message to the accessory device 506 via routing the message through the resident device 504. In some embodiments, the controller device can be configured to always determine to transmit the message to the resident device 504. In this sense, the resident device 504 can act as a relay device between the controller device 502 and the accessory device 506.

At 516, the controller device 502 can transmit the message including the control instructions to the resident device 504. In some embodiments, the controller device 502 transmits the message via a first transmission protocol, and a second duplicate message via a second transmission protocol. For example, the controller device 502 can transmit the message via the Wi-Fi network and transmit the duplicate message via a cellular transmission.

At 518, the resident device 504 can transmit the message including the control instructions to the accessory device 506. In instances that the controller device 502 sent a message and a duplicate message, the resident device 504 can further dispose of the message or duplicate message that was received later in time.

At 520, the accessory device 506 can receive the message from the resident device 504, and further execute the control instructions. For example, above the control instructions were to adjust a volume, and in response, the accessory device can adjust its volume to be higher or lower. In some embodiments, the accessory device 506 would further transmit an accessory state change back to the resident device 504 in response to the volume change.

Figure 6:
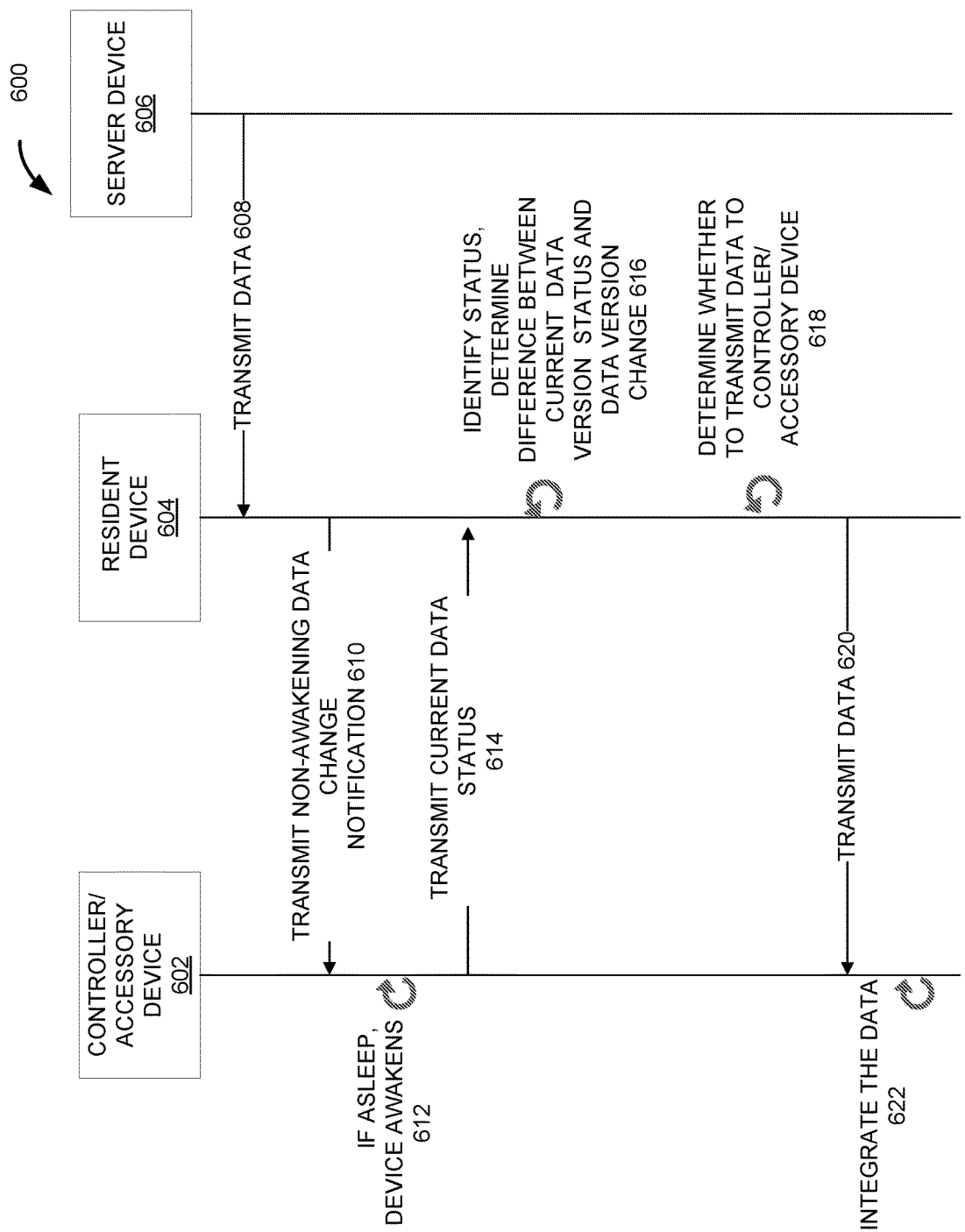
FIG. 6 is a signaling diagram for synchronizing data between a server device and a controller device or accessory device, according to some embodiments.

FIG. 6 is a signaling diagram 600 for synchronizing data between a server device and a controller device or accessory device, according to some embodiments. As illustrated a controller/accessory device 602 is in communication with a resident device 604 and a server device 606. For the purposes of this diagram the process for a controller device is the same as for an accessory device. At 608, the server device 606 can transmit data to the resident device 604. The data can be transmitted based on various reasons, such as a general software update, a request from a device, or in response to a triggering event. The data can include objects such as a software patch, encrypted personal information, information. It should be appreciated that rather than transmit the data to each and every controller/accessory device, the server device 606 sends the data to resident device 604. Upon receipt of the resident device 604 can be responsible for unencrypting the data, identifying a data format, identifying which controller/accessory devices, the data can be relevant to, and converting the data to a compatible format for the controller/accessory device 602.

At 610, in response to receiving the data transmission, the resident device 604 can transmit a non-awakening data change notification, which can include a request for a current data status of the controller/accessory device 602. The notification can be non-awakening in that if the controller/accessory device 602 is in a sleep mode when receiving the notification, the device will not wake up.

612 is an optional step in case the controller/accessory device 602 is in a sleep mode when receiving the notification from the resident device at step 610. If the controller/accessory device 602 was asleep, the device can enter a wake mode based on some triggering event other than the notification of step 610.

At 614, the controller/accessory device 602 can transmit a current data status to the resident device in response to the notification. The current data status can further include a token that can be used to identify the current data status. For example, the token can include a time stamp of the last time that the data at the controller/accessory device was updated. In another instance, the token can include a data identifier, that identifies the last data received from the server device 606.

At 616, the resident device 604 can identify the data status, and determine a difference between the data stored at the controller/accessory device 602 and the data received from the server device 606 at step 608 based on the token. For example, the resident device 604 can store a transaction log that describes each data update for each device. The resident device 604 can further identify an entry in the transaction log based on the token. The resident device 604 can identify the difference based on the data received at step 608 and the entry in the transaction log. The differences can include, for example, an update to a library, an update to a user's personal information, an update to a protocol, or some other data difference.

At 618, the resident device 604 can determine whether to transmit the data to the controller/accessory device based on the analysis at step 616. The resident device 604 can further reformat the data received from the server device 606 from a server device format to a format compatible with an intended recipient device.

At 620, the resident device 604 can transmit the data to controller/accessory device 602. Even if the resident device 604 sends the data, it may not send all of the data to the device. The data received for the server device 606 can be a batch transmission and not all of the data is relevant to each device. Therefore, the resident device 604 does not necessarily transmit all of the data to each device. For example, the resident device 604 can send a first portion of data to a first controller/accessory device and a second portion of data to a second controller/accessory device based on the data status of each individual device.

At 622, the controller/accessory device 602 can integrate the data into the device. For example, the controller/accessory device 602 can store data, delete data, and reconfigure memory based on the data received at step 620.

Figure 7:
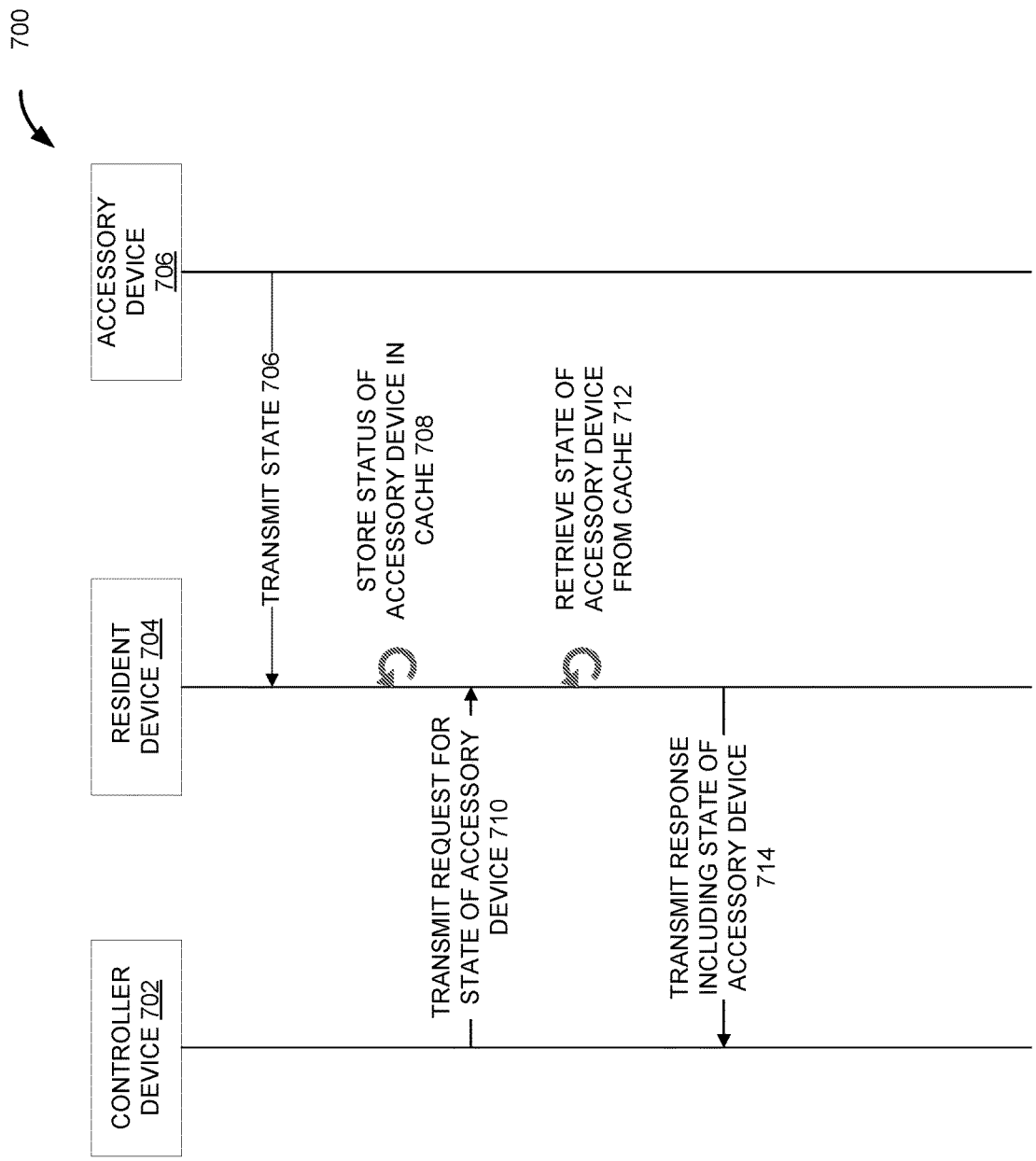
FIG. 7 is a signaling diagram for requesting a state of an accessory device by a controller device, according to some embodiments.

FIG. 7 is a signaling diagram 700 for requesting a state of an accessory device by a controller device, according to some embodiments. As illustrated, a controller device 702 is in communication with a resident device 704 and an accessory device 706. At 708, the accessory device can transmit a state of the accessory device 706, including an accessory device identifier, to the resident device 704. The transmission can be based on various triggers. For example, the transmission can be based on a change in the state of the accessory device 702, a periodic state notification, or in response to a request by the resident device 704.

At 708, the resident device 704 can store the state in cache. In some embodiments, the resident device can have previously stored a state of the accessory device 706. In these embodiments, if the state has not changed, the state stored in cache can persist. If, however, the state of the accessory device 706 has changed, the resident device 704 can delete the old state and write the new state into the cache, including an associated accessory device identifier.

At 710, the controller device 702 can transmit a request the state of the accessory device 710. The request can be generated based on an input from a user that causes a request message to be created by the controller device 702. For example, the request can be a request for whether a garage door is open or closed. In some embodiments, the request further includes an accessory device identifier.

At 712, the resident device 704 can retrieve the state from the cache. The resident device 704 can identify the state by comparing the accessory device identifier accompanying the request at step 710, with the accessory device identifier stored in the cache and associated with the state. The resident device 704 can further generate a response message that includes the accessory device identifier and the state.

At 714, the resident device 704 can transmit the response, including the state of the accessory device, and the accessory device identifier to the controller device 702. In response to receiving the response, the controller device 702 can present the state to a user. For example, the controller device can display whether the garage is opened or closed.

Figure 8:
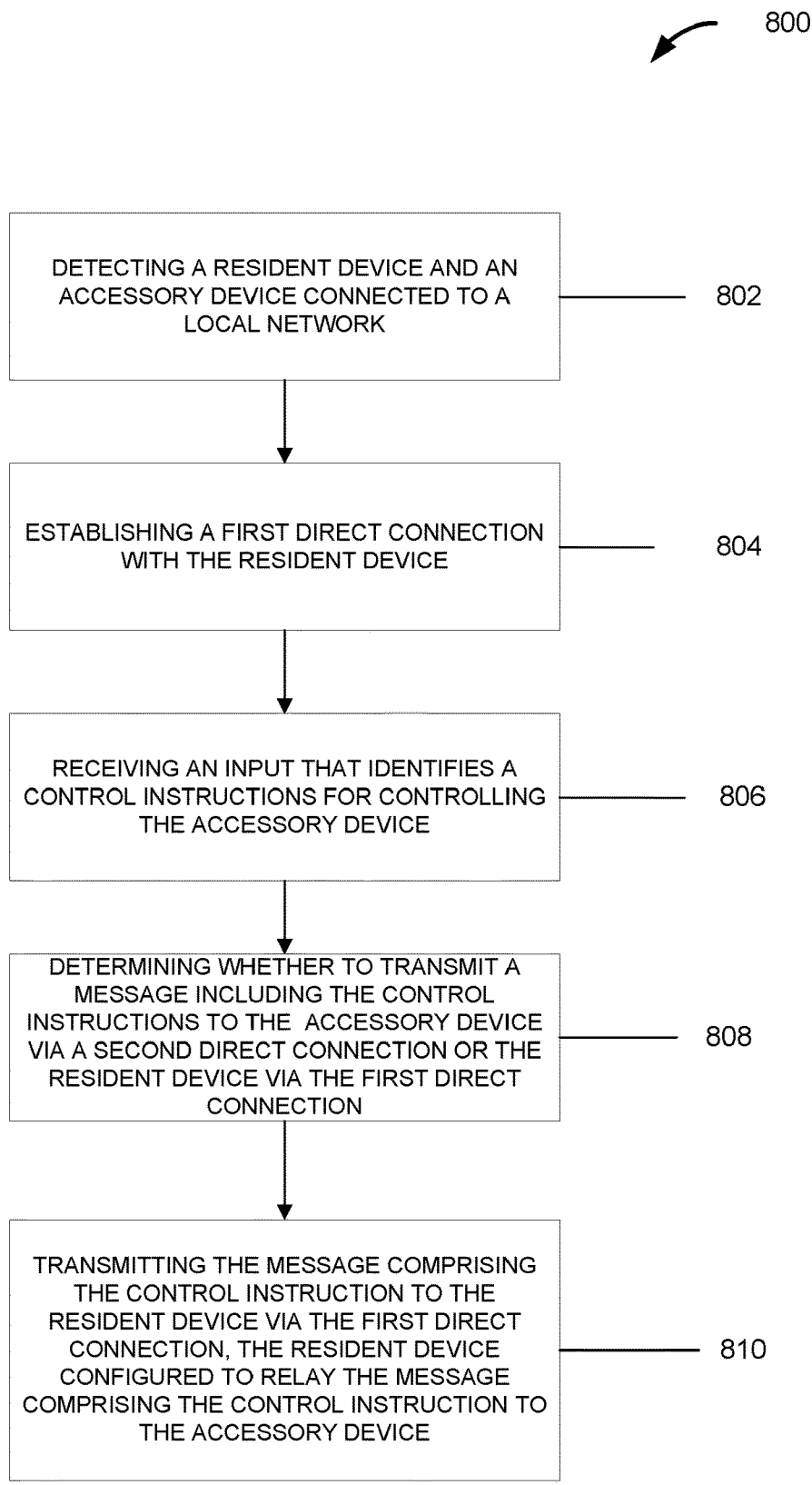
FIG. 8 is a process flow for routing a message from a controller device to an accessory device via a resident device, according to some embodiments.

FIG. 8 is a process flow 800 for routing a message from a controller device to an accessory device via a resident device, according to some embodiments. At 802, the method can include a controller device detecting a resident device and an accessory device connected to a local network. In some instances, upon connecting to the local network, the controller device can detect each other device connected to the network, including the resident device and the accessory device. The controller device can be, for example, a smartphone or a laptop of a user in an environment. The resident device can be, for example, a smart speaker. The accessory device can be, for example, a garage door opener. The controller device, the resident device, and the accessory device can all be devices in an environment such as house or office.

At 804, the method can include the controller device establishing a first direct connection with a resident device. The connection can be based on, for example, a connection between the computing device and the resident device over a network, such as a Wi-Fi network.

At 806, the method can include the controller device receiving an input that identifies a control instruction for controlling the accessory device. The user can interact with the controller device via an I/O device to enter the input that identifies the control instruction. The input can further be to control some aspect of the accessory device that is connected to the network. For example, the control instruction can be to open or close a garage door.

At 808, the method can include the controller device determining whether to transmit a message, including the control instructions, to the resident device using the first direct connection or the accessory device using a second direct connection. In a conventional communication framework, the controller device would send the message with the control instructions directly to the accessory device via the network connection. However, as described herein, the controller device can be configured to not only to recognize the direct and concurrent connections with both the resident device and the accessory device, but to reject an option of transmitting the message directly to the accessory device based at least in part on the detection of the resident device. The controller device can be configured to determine to send the message to the accessory device via routing the message through the resident device. In some embodiments, the controller device can be configured to always send the message to the accessory device by routing the message through the resident device.

At 810, the controller device can transmit the message, including the control instructions, to the resident device using the first direct connection. In some embodiments, the controller device transmits the message via a first transmission protocol (e.g., Wi-Fi), and a second duplicate message via a second transmission protocol (e.g., cellular). The resident device can further be configured to relay the message, including the control instruction, to the accessory device.

Figure 9:
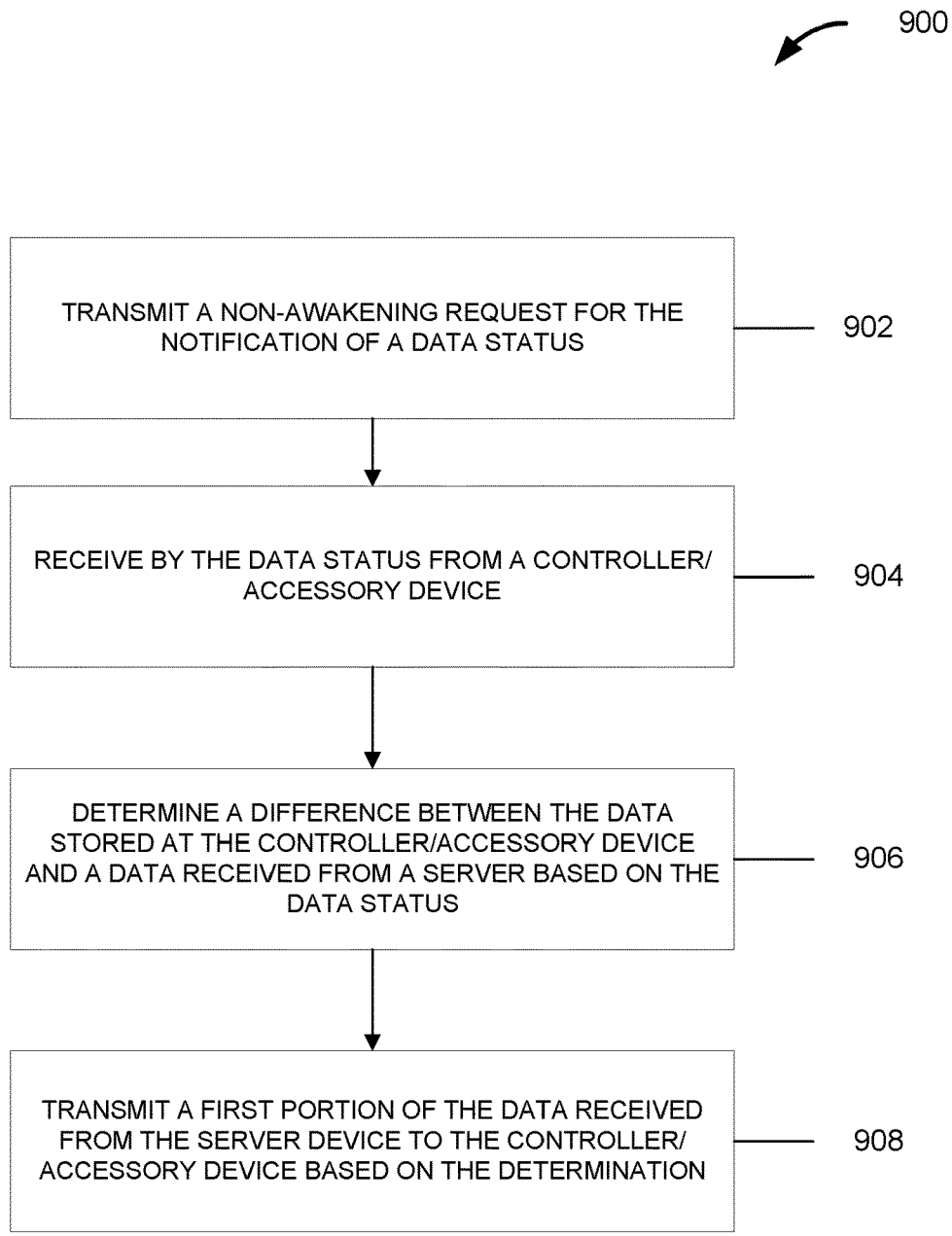
FIG. 9 is a process flow for synchronizing data between a server device and a controller device or accessory device, according to some embodiments.

FIG. 9 is a process flow 900 for synchronizing data between a server device and a controller device or accessory device, according to some embodiments. At 902, a resident device can transmit a non-awakening data change notification, which can include a request for a first data status of a controller/accessory device. The notification can be sent in response to receiving data from a server device. The primary controller device can be located in the same environment as the controller/accessory device.

At 904, the resident device can receive a data status from a controller/accessory device. The data status can be received based on the notification and include a token describing the status of the data.

At 906, the resident device can identify the difference between the data stored on the controller/accessory device and the data received from the server device based on the token. The resident device does not determine the difference by a comparison of the data stored at each controller/accessory and the data received from the server device, rather the difference is determined by the data status as described by the token, and the data received from the server device. For example, the resident device can store a transaction log that describes each update with each device. The resident device can further identify an entry in the transaction log based on the token. The resident device can identify the difference based on the data received at step and the entry in the transaction log. The differences can include an update to a library, an update to a user's personal information, an update to a protocol, or some other data difference.

At 908, the resident device can transmit the data to controller/accessory device. Even if the resident device sends the data, it may not send all of the data to each device. For example, the resident device can send a first portion of data to a first controller/accessory device and a second portion of data to a second controller/accessory device based on the data status of each individual device. The data received for the server device can be a batch transmission and not all of the data is relevant to each device. Therefore, the resident device does not transmit the data to each device.

Figure 10:
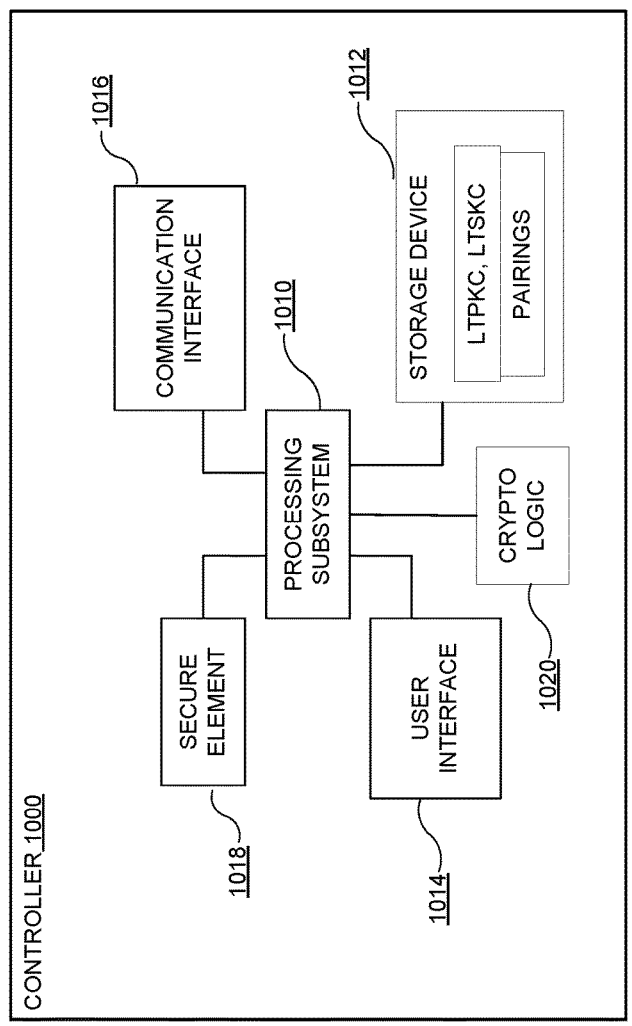
FIG. 10 is a block diagram of a controller device according to some embodiments.

FIG. 10 is a block diagram of a controller 1000, according to some embodiments. Controller 1000 can implement any or all of the controller functions, behaviors, and capabilities described herein, as well as other functions, behaviors, and capabilities not expressly described. Controller 1000 can include processing subsystem 1010, storage device 1012, user interface 1014, communication interface 1016, secure element 1018, and cryptographic logic module 1020. Controller 1000 can also include other components (not explicitly shown) such as a battery, power controllers, and other components operable to provide various enhanced capabilities. In various embodiments, controller 1000 can be implemented in a desktop computer, laptop computer, tablet computer, smart phone, wearable computing device, or other systems having any desired form factor. Further, as noted above, controller 1000 can be implemented partly in a base station and partly in a mobile unit that communicates with the base station and provides a user interface.

Storage device 1012 can be implemented, e.g., using disk, flash memory, or any other non-transitory storage medium, or a combination of media, and can include volatile and/or nonvolatile media. In some embodiments, storage device 1012 can store one or more application and/or operating system programs to be executed by processing subsystem 1010, including programs to implement any or all operations described herein as being performed by a controller. For example, storage device 1012 can store a uniform controller application that can read an accessory definition record and generate a graphical user interface for controlling the accessory based on information therein. In some embodiments, portions (or all) of the controller functionality described herein can be implemented in operating system programs rather than applications. In some embodiments, storage device 1012 can also store apps designed for specific accessories or specific categories of accessories (e.g., an IP camera app to manage an IP camera accessory or a security app to interact with door lock accessories).

User interface 1014 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital to analog or analog to digital converters, signal processors, or the like). A user can operate input devices of user interface 1014 to invoke the functionality of controller 1000 and can view and/or hear output from controller 1000 via output devices of user interface 1014.

Processing subsystem 1010 can be implemented as one or more integrated circuits, e.g., one or more single core or multi core microprocessors or microcontrollers, examples of which are known in the art. In operation, processing system 1010 can control the operation of controller 1000. In various embodiments, processing subsystem 1010 can execute a variety of programs in response to program code and can maintain multiple concurrently executing programs or processes. At any given time, some or all of the program code to be executed can be resident in processing subsystem 1010 and/or in storage media such as storage device 1012.

Through suitable programming, processing subsystem 1010 can provide various functionality for controller 1000. For example, in some embodiments, processing subsystem 1010 can implement various processes (or portions thereof) described above as being implemented by a controller. Processing subsystem 1010 can also execute other programs to control other functions of controller 1000, including programs that may be stored in storage device 1012. In some embodiments, these programs may interact with an accessory, e.g., by generating messages to be sent to the accessory and/or receiving messages from the accessory. Such messages can conform to a uniform accessory protocol as described above.

Communication interface 1016 can provide voice and/or data communication capability for controller 1000. In some embodiments communication interface 1016 can include radio frequency (RF) transceiver components for accessing wireless voice and/or data networks (e.g., using cellular telephone technology, data network technology such as 3G, 4G/LTE, Wi Fi (IEEE 802.11 family standards), or other mobile communication technologies, or any combination thereof), components for short range wireless communication (e.g., using Bluetooth and/or Bluetooth LE standards, NFC, etc.), and/or other components. In some embodiments communication interface 1016 can provide wired network connectivity (e.g., Ethernet) in addition to or instead of a wireless interface. Communication interface 1016 can be implemented using a combination of hardware (e.g., driver circuits, antennas, modulators/demodulators, encoders/decoders, and other analog and/or digital signal processing circuits) and software components. In some embodiments, communication interface 1016 can support multiple communication channels concurrently, using the same transport or different transports.

Secure element 1018 can be an integrated circuit or the like that can securely store cryptographic information for controller 1000. Examples of information that can be stored within secure element 1018 include the controller's long term public and secret keys (LTPKC, LTSKC as described above), and a list of paired accessories (e.g., a lookup table that maps accessory ID to accessory long term public key LTPKA for accessories that have completed a pair setup or pair add process as described above).

In some embodiments, cryptographic operations can be implemented in a cryptographic logic module 1020 that communicates with secure element 1018. Physically, cryptographic logic module 1020 can be implemented in the same integrated circuit with secure element 1018 or a different integrated circuit (e.g., a processor in processing subsystem 1010) as desired. Cryptographic logic module 1020 can include various logic circuits (fixed or programmable as desired) that implement or support cryptographic operations of controller 1000, including any or all cryptographic operations described above. Secure element 1018 and/or cryptographic logic module 1020 can appear as a "black box" to the rest of controller 1000. Thus, for instance, communication interface 1016 can receive a message in encrypted form that it cannot decrypt and can simply deliver the message to processing subsystem 1010. Processing subsystem 1010 may also be unable to decrypt the message, but it can recognize the message as encrypted and deliver it to cryptographic logic module 1020. Cryptographic logic module 1020 can decrypt the message (e.g., using information extracted from secure element 1018) and determine what information to return to processing subsystem 1010. As a result, certain information can be available only within secure element 1018 and cryptographic logic module 1020. If secure element 1018 and cryptographic logic module 1020 are implemented on a single integrated circuit that executes code only from an internal secure repository, this can make extraction of the information extremely difficult, which can provide a high degree of security. Other implementations are also possible.

Figure 11:
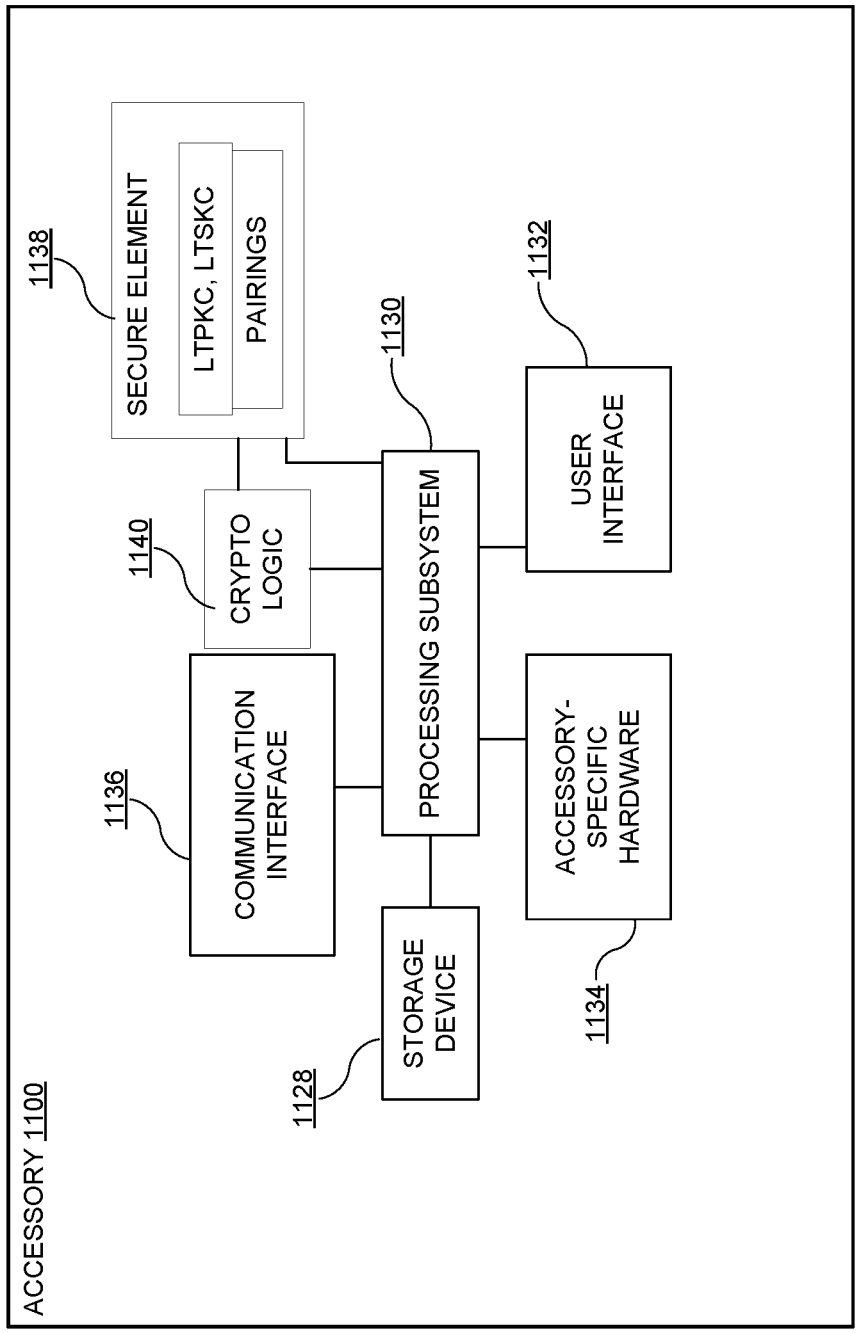
FIG. 11 is a block diagram of an accessory device according to some embodiments.

FIG. 11 is a block diagram of an accessory 1100, according to some embodiments. Accessory 1100 can implement any or all of the accessory functions, behaviors, and capabilities described herein, as well as other functions, behaviors, and capabilities not expressly described. Accessory 1100 can include storage device 1128, processing subsystem 1130, user interface 1132, accessory specific hardware 1134, communication interface 1136, secure element 1138, and cryptographic logic module 1140. Accessory 1100 can also include other components (not explicitly shown) such as a battery, power controllers, and other components operable to provide various enhanced capabilities.

Accessory 1100 is representative of a broad class of accessories that can be operated by a controller such as controller 1000, and such accessories can vary widely in capability, complexity, and form factor. Various accessories may include components not explicitly shown in FIG. 11, including but not limited to storage devices (disk, flash memory, etc.) with fixed or removable storage media; video screens, speakers, or ports for connecting to external audio/video devices; camera components such as lenses, image sensors, and controls for same (e.g., aperture, zoom, exposure time, frame rate, etc.); microphones for recording audio (either alone or in connection with video recording); and so on.

Storage device 1128 can be implemented, e.g., using disk, flash memory, or any other non-transitory storage medium, or a combination of media, and can include volatile and/or nonvolatile media. In some embodiments, storage device 1128 can store one or more programs to be executed by processing subsystem 1130, including programs to implement various operations described above as being performed by an accessory, as well as operations related to particular accessory behaviors. Storage device 1128 can also store an accessory object or accessory definition record (e.g., as described above) that can be furnished to controller devices, e.g., as described above. Storage device 1128 can also store accessory state information and any other data that may be used during operation of accessory 1100.

Processing subsystem 1130 can include, e.g., one or more single core or multi core microprocessors and/or microcontrollers executing program code to perform various functions associated with accessory 1100. For example, processing subsystem 1130 can implement any or all operations described herein as being implemented by an accessory, e.g., by executing program code stored in storage device 1128. Processing subsystem 1130 can also execute other programs to control other functions of accessory 1130. In some instances programs executed by processing subsystem 1130 can interact with a controller (e.g., controller 1000), e.g., by generating messages to be sent to the controller and/or receiving messages from the controller. Such messages can conform to a uniform accessory protocol as described above.

User interface 1132 may include user operable input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital to analog or analog to digital converters, signal processors, or the like). Depending on the implementation of a particular accessory 1100, a user can operate input devices of user interface 1132 to invoke functionality of accessory 1100 and can view and/or hear output from accessory 1100 via output devices of user interface 1134. Some accessories may provide a minimal or no user interface.

Accessory specific hardware 1134 can include any other components that may be present in accessory 1100 to enable or support its functionality. For example, in various embodiments accessory specific hardware 1134 can include one or more storage devices using fixed or removable storage media; GPS receiver; power supply and/or power management circuitry; a camera; a microphone; one or more actuators; environmental sensors (e.g., temperature sensor, pressure sensor, accelerometer, chemical sensor, etc.); and so on.

It is to be understood that any type of accessory functionality can be supported by providing appropriate accessory specific hardware 1134.

Communication interface 1136 can provide voice and/or data communication capability for accessory 1100. In some embodiments communication interface 1136 can include radio frequency (RF) transceiver components for accessing wireless voice and/or data networks (e.g., using cellular telephone technology, data network technology such as 3G, 4G/LTE, Wi Fi (IEEE 802.11 family standards), or other mobile communication technologies, or any combination thereof), components for short range wireless communication (e.g., using Bluetooth and/or Bluetooth LE standards, NFC, etc.), and/or other components. In some embodiments communication interface 1136 can provide wired network connectivity (e.g., Ethernet) in addition to or instead of a wireless interface. Communication interface 1136 can be implemented using a combination of hardware (e.g., driver circuits, antennas, modulators/demodulators, encoders/decoders, and other analog and/or digital signal processing circuits) and software components. In some embodiments, communication interface 1136 can support multiple communication channels concurrently, using the same transport or different transports.

Secure storage module 1138 can be an integrated circuit or the like that can securely store cryptographic information for accessory 1100. Examples of information that can be stored within secure storage module 1138 include the accessory's long term public and secret keys (LTPKA, LTSKA as described above), and a list of paired controllers (e.g., a lookup table that maps controller ID to controller long term public key LTPKC for controllers that have completed a pair setup or pair add process as described above).

In some embodiments, cryptographic operations can be implemented in a cryptographic logic module 1140 that communicates with secure storage module 1138. Physically, cryptographic logic module 1140 can be implemented in the same integrated circuit with secure storage module 1138 or a different integrated circuit (e.g., a processor in processing subsystem 1130) as desired. Cryptographic logic module 1140 can include various logic circuits (fixed or programmable as desired) that implement or support cryptographic operations of accessory 1100, including any or all cryptographic operations described above. Secure storage module 1138 and/or cryptographic logic module 1140 can appear as a "black box" to the rest of accessory 1100. Thus, for instance, communication interface 1136 can receive a message in encrypted form that it cannot decrypt and can simply deliver the message to processing subsystem 1130. Processing subsystem 1130 may also be unable to decrypt the message, but it can recognize the message as encrypted and deliver it to cryptographic logic module 1140. Cryptographic logic module 1140 can decrypt the message (e.g., using information extracted from secure storage module 1138) and determine what information to return to processing subsystem 1130. As a result, certain information can be available only within secure storage module 1138 and cryptographic logic module 1140. If secure storage module 1138 and cryptographic logic module 1140 are implemented on a single integrated circuit that executes code only from an internal secure repository, this can make extraction of the information extremely difficult, which can provide a high degree of security. Other implementations are also possible.

Accessory 1100 can be any electronic apparatus that interacts with a controller such as controller 1000. In some embodiments, controller 1000 can provide remote control over operations of accessory 1100 as described above. For example, controller 1000 can provide a remote user interface for accessory 1100 that can include both input and output controls (e.g., a display screen to display current status information obtained from accessory 1100 and an input control such as a touchscreen overlay to allow changes to the status information). Controller 1000 in various embodiments can control any function of accessory 1100 and can also receive data from accessory 1100.

While specific embodiments have been described, one skilled in the art will recognize that numerous modifications are possible. A single controller may use processes described herein to establish pairings with any number of accessories and to selectively communicate with different accessories at different times. Similarly, a single accessory may be controlled by multiple controllers with which it has established pairings. Any function of an accessory may be controlled by modeling the function as a service having one or more characteristics and allowing a controller to interact with (e.g., read, modify, receive updates) the service and/or its characteristics. Accordingly, protocols and communication processes as described herein may be "universal," meaning that they may be applied in any context with one or more controllers and one or more accessories regardless of accessory function or controller form factor or specific interfaces.

Thus, although specific embodiments have been described, it will be appreciated that embodiments may include all modifications and equivalents within the scope of the following claims.

As described above, one aspect of the present technology is the gathering and use of data available and routing the delivery of messages from one resident device and to one or more devices. The present disclosure contemplates that in some instances, this gathered data may include personal information data that uniquely identifies or may be used to identify a specific person. Such personal information data may include demographic data, location-based data, online identifiers, telephone numbers, email addresses, home addresses, data or records, date of birth, or any other personal information.

The present disclosure recognizes that the use of such personal information data, in the present technology, may be used to the benefit of users. For example, the personal information data may be used to deliver a command from a user profile on a computing device to one or more computing devices. Further, other uses for personal information data that benefit the user are also contemplated by the present disclosure. For instance, specific states of devices associated with the user may be transmitted from a device back to the user profile.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities may subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements may be provided to prevent or block access to such personal information data. For example, such as in the case of token generation services, the present technology may be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Illustrative techniques for using a computing devices to delegate authority to generate a token from an owner to a sharing platform, and provisioning the token by the sharing platform. Some or all of these techniques may, but need not, be implemented at least partially by as those shown at least in FIGS. 1-11 above. While many of the embodiments are described above with reference to computing devices and user devices, it should be understood that other types of computing devices may be suitable to perform the techniques disclosed herein. Further, in the foregoing description, various non-limiting examples were described. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C # or C++, or any scripting language, such as Perl, Python or TCL, as well as combinations thereof. The server(s) may also include database servers, including without limitation those commercially available from Oracle °, Microsoft®, Sybase®, and IBM®

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium that can be used to store the desired information and that can be accessed by the a system device. Based at least in part on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a," "an," and "the," and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based at least in part on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method, comprising:
   detecting, by a controller device, an accessory device connected to a local network;
   establishing, by the controller device and via the local network, a first direct connection with the accessory device;
   receiving, by the controller device, an input that identifies a control instruction for controlling the accessory device;
   detecting, by the controller device, that a resident device is also connected to the local network;
   determining based at least in part on the detection that the resident device is also connected to the local network, to transmit a message comprising the control instruction to the accessory device via a second direct connection with the resident device; and
   transmitting, by the controller device, the message comprising the control instruction to the resident device via the second direct connection with the resident device, the resident device configured to relay the message comprising the control instruction to the accessory device.

2. The method of claim 1, wherein the method further comprises establishing, by the controller device, the second direct connection with the resident device.

3. The method of claim 1, wherein the method further comprises severing the first direct connection with the accessory device prior to receiving the input.

4. The method of claim 1, wherein the method further comprises always determining to transmit the message comprising the control instruction to the resident device via the second direct connection with the resident device.

5. The method of claim 1, wherein the method further comprises:

receiving an accessory device state from the resident device; and storing the accessory device state in a local memory.

6. The method of claim 5, wherein the accessory device state is received based at least in part on a change in a state of the accessory device.

7. The method of claim 1, wherein the method further comprises:

receiving a notification of a data status of the accessory device;

determining a difference between the data status of the accessory device and data received from a server; and transmitting a first portion of the data received from the server to the accessory device based at least in a part on the determination.

8. A device, comprising:

a computer-readable medium including computer-executable instructions; and a processor configured to access the computer-readable medium and to execute the computer-executable instructions to at least:

detect an accessory device connected to a local network;

establish, via the local network, a first direct connection with the accessory device;

receive an input that identifies a control instruction for controlling the accessory device;

detect that a resident device is also connected to the local network;

determine, based at least in part on the detection that the resident device is also connected to the local network, to transmit a message comprising the control instruction to the accessory device via a second direct connection with the resident device; and transmit the message comprising the control instruction to the resident device via the second direct connection with the resident device, the resident device configured to relay the message comprising the control instruction to the accessory device.

9. The device of claim 8, wherein the processor is further configured to at least establish the second direct connection with the resident device.

10. The device of claim 8, wherein the processor is further configured to at least sever the first direct connection with the accessory device prior to receiving the input.

11. The device of claim 8, wherein the processor is further configured to always determine to transmit the message comprising the control instruction to the resident device via the second direct connection with the resident device.

12. The device of claim 8, wherein the processor is further configured to:

receive an accessory device state from the resident device; and store the accessory device state in a local memory.

13. The device of claim 12, wherein the accessory device state is received based at least in part on a change in a state of the accessory device.

14. The device of claim 8, wherein the processor is further configured to:

receive a notification of a data status of the accessory device;

determine a difference between the data status of the accessory device and data received from a server; and transmit a first portion of data received from the server to the accessory device based at least in a part on the determination.

15. A non-transitory computer-readable medium including stored thereon a sequence of instructions that, when executed by a processor, causes the processor to perform operations comprising:

detecting an accessory device connected to a local network;

establishing, via the local network, a first direct connection with the accessory device;

receiving an input that identifies a control instruction for controlling the accessory device;

detecting that a resident device is also connected to the local network determining, based at least in part on the detection that the resident device is also connected to the local network, to transmit a message comprising the control instruction to the accessory device via a second direct connection with the resident device; and transmitting the message comprising the control instruction to the resident device via the second direct connection with the resident device, the resident device configured to relay the message comprising the control instruction to the accessory device.

16. The non-transitory computer-readable medium of claim 15, wherein the operations further comprise establishing the second direct connection with the resident device.

17. The non-transitory computer-readable medium of claim 15, wherein the operations further comprise severing the first direct connection with the accessory device prior to receiving the input.

18. The non-transitory computer-readable medium of claim 15, wherein the operations further comprise always determining to transmit the message comprising the control instruction to the resident device via the second direct connection with the resident device.

19. The non-transitory computer-readable medium of claim 15, wherein the operations further comprise:

receiving an accessory device state from the resident device; and storing the accessory device state in a local memory.

20. The non-transitory computer-readable medium of claim 19, wherein the accessory device state is received based at least in part on a change in a state of the accessory device.

* * * * *